(12) United States Patent
Vance et al.

(10) Patent No.: US 9,024,586 B2
(45) Date of Patent: *May 5, 2015

(54) BATTERY FAULT TOLERANT ARCHITECTURE FOR CELL FAILURE MODES SERIES BYPASS CIRCUIT

(75) Inventors: Steven J. Vance, Shelby Township, MI (US); John T. Guerin, Bloomfield, MI (US); Andrew H. Leutheuser, Sunnyvale, CA (US); John C. Mentzer, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 584 days.

This patent is subject to a terminal disclaimer.

(21) Appl. No.: 12/904,906

(22) Filed: Oct. 14, 2010

(65) Prior Publication Data

US 2012/0091964 A1    Apr. 19, 2012

(51) Int. Cl.
| | | |
|---|---|---|
| H02J 7/00 | (2006.01) | |
| B60L 3/00 | (2006.01) | |
| B60L 3/04 | (2006.01) | |
| B60L 11/18 | (2006.01) | |
| H01M 10/44 | (2006.01) | |
| H01M 10/0525 | (2010.01) | |

(52) U.S. Cl.
CPC ............ *H02J 7/0026* (2013.01); *B60L 3/0046* (2013.01); *B60L 3/0092* (2013.01); *B60L 3/04* (2013.01); *B60L 11/1866* (2013.01); *B60L 2210/30* (2013.01); *B60L 2210/40* (2013.01); *B60L 2240/545* (2013.01); *B60L 2250/10* (2013.01); *H01M 10/0525* (2013.01); *H01M 10/441* (2013.01); *H01M 2220/20* (2013.01); *Y02T 10/7005* (2013.01); *Y02T 10/7011* (2013.01); *Y02T 10/7055* (2013.01); *Y02T 10/7061* (2013.01); *Y02T 10/7241* (2013.01)

(58) Field of Classification Search
CPC ...................................................... H02J 7/0016
USPC .................................................. 320/122, 116
See application file for complete search history.

(56) References Cited

U.S. PATENT DOCUMENTS

| | | | | |
|---|---|---|---|---|
| 6,034,506 | A * | 3/2000 | Hall ............................... | 320/117 |
| 6,121,752 | A * | 9/2000 | Kitahara et al. .............. | 320/122 |
| 6,265,846 | B1 * | 7/2001 | Flechsig et al. ............... | 320/116 |
| 6,580,249 | B2 * | 6/2003 | Yau et al. ....................... | 320/122 |
| 6,599,655 | B2 * | 7/2003 | Johnson et al. ................. | 429/50 |
| 6,933,703 | B2 * | 8/2005 | Dubac et al. ................... | 320/121 |
| 7,456,610 | B2 * | 11/2008 | Yamashita .................... | 320/119 |
| 7,557,538 | B2 * | 7/2009 | Yau et al. ....................... | 320/116 |
| 8,212,522 | B2 * | 7/2012 | Deal et al. ..................... | 320/116 |

(Continued)

*Primary Examiner* — Richard Isla Rodas
*Assistant Examiner* — Nathaniel Pelton
(74) *Attorney, Agent, or Firm* — John A. Miller; Miller IP Group, PLC

(57) ABSTRACT

A battery cell by-pass circuit that has particular application for by-passing cells in a high voltage battery for a vehicle. The battery includes a plurality of battery cells electrically coupled in series. The by-pass circuit includes a first switch electrically coupled in series with one or more of the battery cells, a by-pass line electrically coupled around the one or more battery cells and a second switch electrically coupled in the by-pass line and in parallel with the one or more battery cells. During normal cell operation, the first switch is closed and the second switch is open so that current flows through the one or more battery cells. If the one or more battery cells fail or are failing, the first switch is opened and the second switch is closed so that current by-passes the one or more cells and they are removed from the battery circuit.

15 Claims, 3 Drawing Sheets

(56) References Cited

U.S. PATENT DOCUMENTS

| | | | |
|---|---|---|---|
| 8,471,529 B2 * | 6/2013 | Vance et al. | 320/134 |
| 2008/0258683 A1 * | 10/2008 | Chang | 320/112 |
| 2009/0023053 A1 | 1/2009 | Berdichevsky et al. | |
| 2009/0251100 A1 * | 10/2009 | Incledon et al. | 320/106 |
| 2011/0057617 A1 * | 3/2011 | Finberg et al. | 320/118 |

* cited by examiner

BATTERY FAULT TOLERANT ARCHITECTURE FOR CELL FAILURE MODES SERIES BYPASS CIRCUIT

BACKGROUND OF THE INVENTION

1. Field of the Invention

This invention relates generally to a by-pass circuit for a battery and, more particularly, to a series by-pass circuit for a vehicle battery system that disconnects and by-passes one or more battery cells or modules in the battery system in response to cell or module failure or a potential cell or module failure.

2. Discussion of the Related Art

Electric vehicles are becoming more and more prevalent. These vehicles include hybrid vehicles, such as the extended range electric vehicles (EREV) that combine a battery and a main power source, such as an internal combustion engine, fuel cell systems, etc., and electric only vehicles, such as the battery electric vehicles (BEV). All of these types of electric vehicles employ a high voltage battery that includes a number of battery cells. These batteries can be different battery types, such as lithium ion, nickel metal hydride, lead acid, etc. A typical high voltage battery system for an electric vehicle may include a large number of battery cells or modules to meet the vehicle power and energy requirements. The battery system can include individual battery modules where each battery module may include a certain number of battery cells, such as twelve cells. The individual battery cells may be electrically coupled in series, or a series of cells may be electrically coupled in parallel, where a number of cells in the module are connected in series and each module is electrically coupled to the other modules in parallel. Different vehicle designs include different battery designs that employ various trade-offs and advantages for a particular application.

A battery cell in a battery may fail or may otherwise be limited in performance for a number of reasons, such as an internal short, loss of capacity, high resistance, high temperature, etc. A vehicle battery pack typically includes a variety of sensors and other diagnostic devices that can determine if the battery performance is limited, is failing or may fail in the near future. Because the battery cells may be electrically coupled in series, failure of one cell in the series may prevent use of other cells in the series and may result in vehicle shut-down. Therefore, the battery can be disconnected from the circuit before a major battery failure has occurred and warning lights can be provided indicating such a failure.

Depending on the battery type, such a failure may result in a walk-home condition where the vehicle needs to be towed and cannot be driven. It would be desirable to provide a circuit where individual cells of a battery can be switched out of the circuit so that the walk-home condition and other scenarios may be avoided.

SUMMARY OF THE INVENTION

In accordance with the teachings of the present invention, a battery cell by-pass circuit is disclosed that has particular application for by-passing one or more cells in a high voltage battery for a vehicle. The battery includes a plurality of battery cells electrically coupled in series. The by-pass circuit includes a first switch electrically coupled in series with one or more of the battery cells, a by-pass line electrically coupled around the one or more battery cells and a second switch electrically coupled in the by-pass line and in parallel with the one or more battery cells. During normal cell operation, the first switch is closed and the second switch is open so that current flows through the one or more battery cells. If the one or more battery cells fail or are failing, the first switch is opened and the second switch is closed so that current by-passes the one or more cells and they are removed from the battery circuit.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a series by-pass circuit for by-passing one or more battery cells is merely exemplary in nature, and is in no way intended to limit the invention or its applications or uses. For example, the series by-pass circuit of the invention has particular application for by-passing one or more battery cells in a vehicle battery. However, as will be appreciated by those skilled in the art, the by-pass circuit of the invention will have application for other batteries in other systems.

Figure 1:
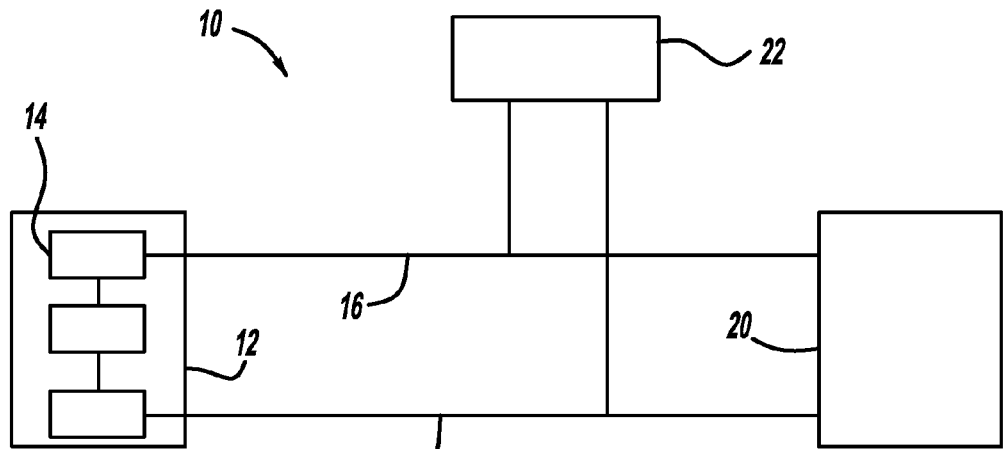
FIG. 1 is a block diagram of a vehicle electrical system.

FIG. 1 is a block diagram of a vehicle system 10 including a high voltage battery 12. The high voltage battery 12 includes a plurality of battery modules 14, each including a plurality of battery cells electrically coupled in series. In one non-limiting example, the battery 12 may include eight of the modules 14, where each of the modules 14 may include twelve cells for a total of ninety-six cells. The total voltage may be in the 350-400 volt range. The battery 12 is electrically coupled to a high voltage bus represented by lines 16 and 18. In this non-limiting design, the vehicle system 10 is part of a hybrid vehicle that includes a main power source 20, such as an internal combustion engine, fuel cell system, etc. The power source 20 is also electrically coupled to the high voltage bus lines 16 and 18. The battery 12 and the power source 20 provide power to the bus lines 16 and 18 in any suitable controlled configuration for a particular application, where the battery 12 and the power source 20 are matched to the bus lines 16 and 18. Vehicle loads 22 are electrically coupled to the bus lines 16 and 18, and represent any vehicle load that receives power from the vehicle power systems, namely the battery 12 and the power source 20, such as the vehicle propulsion system, electric motors, auxiliary loads, etc. Suitable electrical components would be provided to step down the voltage for those loads that are low voltage loads.

Figure 2:
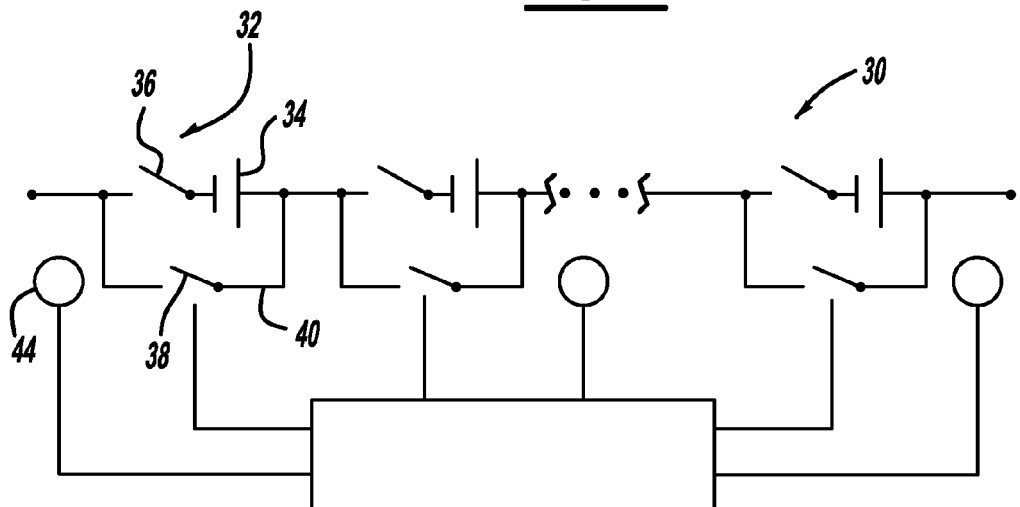
FIG. 2 is a schematic diagram of a plurality of cells in a vehicle battery including by-pass circuits.

FIG. 2 is a schematic diagram of a battery circuit 30, which can be the circuit within one of the modules 14, for example. The battery circuit 30 includes a battery cell by-pass circuit 32 in association with each battery cell 34 in the circuit 30, where the battery cells 34 are electrically coupled in series. Each by-pass circuit 32 includes a first switch 36 electrically coupled in series with the battery cell 34 and a second switch 38 electrically coupled in parallel with the battery cell 34 in a by-pass line 40. The switches 36 and 38 can be any switch suitable for the purposes described herein, such as solid-state switches, relays, mechanical disconnects, etc. Examples of mechanical disconnects include back plane and bus-bar designs. Determining what type of switch to use considers the particular battery design, size and weight considerations, cost considerations, parasitic loss considerations, etc. A controller 42 controls the position of the switches 36 and 38 in each by-pass circuit 32 consistent with the discussion herein. In this non-limiting embodiment, the controller 42 receives temperature signals from temperature sensors 44 in the circuit 30.

During normal operation, the switch 36 is closed and the switch 38 is open so that current travels through the cell 34. If a cell failure mode, or a potential cell failure mode, is detected for a particular cell 34 in the circuit 30, the controller 42 will open the switch 36 and close the switch 38 allowing current to travel through the by-pass line 40 and around the cell 34. Thus, in this situation, the overall power of the circuit 30 or the battery 12 will be decreased by the size of the cell 34 or the percentage of power that the particular cell 34 provided.

The controller 42 can detect a failed, potentially failing and/or low performing cell in any manner suitable for the purposes described herein, many of which are well known to those skilled in the art. For example, battery diagnostics currently exist in the art where the voltage of each battery cell 34 is measured, and compared to a desired voltage level to determine cell performance. Further, the temperature sensors 44 can be used to measure the temperature of each cell 34, or a plurality of cells, to determine whether the temperature of those cells 34 exceeds a predetermined maximum temperature threshold indicating a high resistance. The actual technique for determining potential cell failure is unimportant so long as that potential cell failure is able to be detected and the switches 36 and 38 can be switched accordingly.

Current vehicle technology allows the vehicle control system to determine that the battery 12 is operating properly and no action needs to be taken, provide a limited battery power mode that provides limited battery power in response to a potential battery cell failure mode, and full battery shut-down where a battery failure has occurred and the system disconnects the battery 12 from the vehicle system itself. The present invention provides an additional mode to these three diagnostic modes where a cell failure or potential cell failure has been detected and that cell is removed from the series connection of cells so that the battery 12 can operate normally without that cell.

The embodiment discussed above for the battery circuit 30 includes a by-pass circuit for each battery cell 34. However, depending on the number of the cells 34 in the battery 12, providing two switches for each cell may not be desirable because of insertion losses, component parasitic losses, etc., associated with each switch. Further, there are volume and weight considerations that must be addressed as a result of putting the switches 36 and 38 in the battery enclosure. Further, current battery designs employ specialized circuitry that monitors a predetermined number of the cells for voltage and temperature for a particular design. However, the more cells that are by-passed during a potential fault condition, the less power the battery 12 is able to produce because of the loss of the cells. In other words, if a single cell has failed or is failing and the by-pass circuit by-passes several cells as a group if one of the cells fails, then all of the power produced by those cells is lost even though it is only one cell of the group that has a potential problem. Thus, the desirable by-pass configuration may or may not be to by-pass several cells 34.

Figure 3:
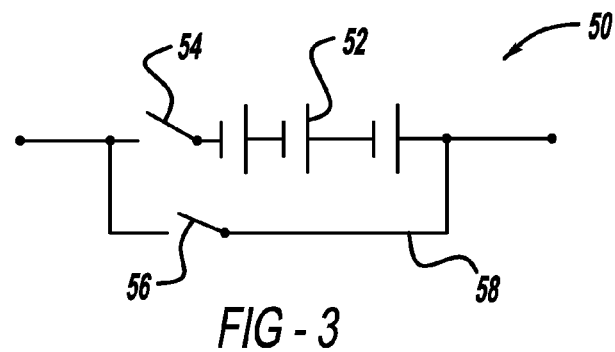
FIG. 3 is a schematic diagram of a battery by-pass circuit.

FIG. 3 is a schematic diagram of a by-pass circuit 50 showing how a plurality of battery cells 52 can all be by-passed by two switches. Particularly, a first switch 54 is electrically coupled in series with the plurality of cells 52 and a second switch 56 is provided in a by-pass line 58 around the plurality of cells 52. As above, during normal operation, the switch 54 is closed and the switch 56 is open so that all of the cells 52 are electrically coupled in series in the battery circuit. If a potential cell problem is detected for any one of the plurality of the cells 52, then the switch 54 is opened and the switch 56 is closed to by-pass all of the cells 52, where the battery loses the power provided by the group of the cells 52.

The by-pass circuit described above is for series connected battery cells. However, in other battery designs, the battery modules 14 may each include a plurality of series connected cells and the modules 14 may be electrically connected in parallel. In this configuration, the lowest performing battery module would define the performance of the entire battery as a result of the parallel connection because lower performing modules would draw power from higher performing modules. Thus, battery modules with a lower capability would dictate the performance of the battery regardless of the capability of the higher performing battery modules.

Different designs could benefit from different electrical configurations of battery cells by placing some of the cells in series with other cells and then placing groups of cells that are in series in parallel with each other. For example, for a modular design having modules of series connected battery cells that can be added to get the desired energy or power may benefit by electrically coupling standardized series groups of cells or modules in parallel where adding another cell or module would increase the total power of the battery pack. By electrically coupling additional battery packs of the same number of battery cells in parallel, the output voltage of the entire battery circuit would remain the same, but the kilowatt hours of energy the battery would increase by the number of modules added so that the electrical circuitry used for the various propulsion motors and other circuits could be the same from battery circuit to battery circuit.

Figure 4:
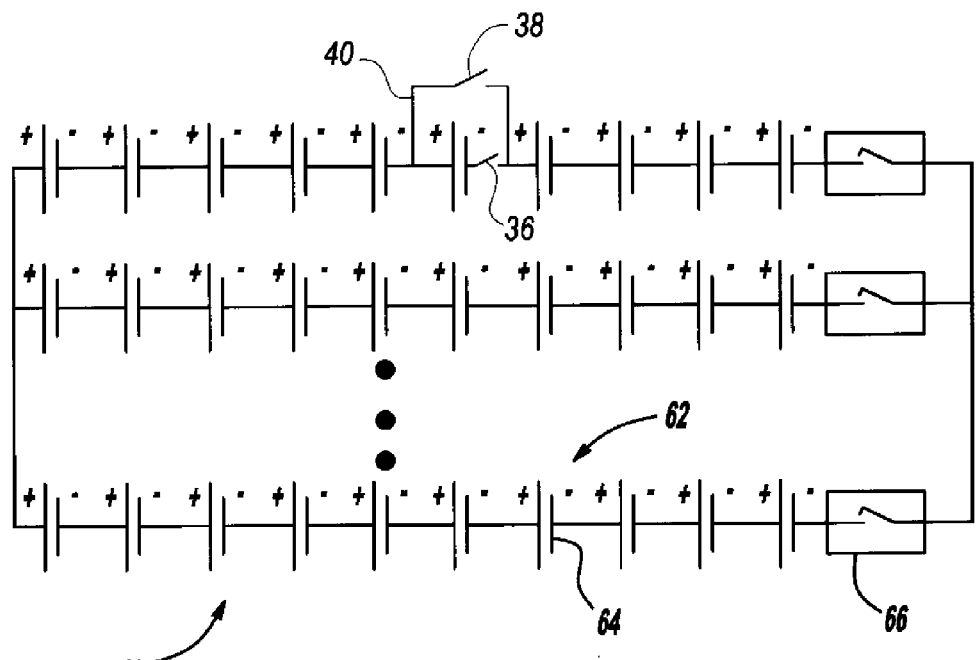
FIG. 4 is a schematic diagram of parallel connected battery cells for a vehicle battery.

FIG. 4 is a schematic diagram of a battery pack 60 including parallel connected strings 62 of series connected battery cells 64, where each string 62 includes the same number of cells 64. In this parallel connected design, the same benefits of a by-pass circuit can be achieved by providing switches at the appropriate locations. As above, each individual cell 64 in each string 62 can include its own by-pass circuit where if that cell fails, it can be switched out of the particular string 62. However, a more feasible or cost effective approach may be to switch the entire string 62 out of the battery pack 60 if one or more of the particular cells 64 within that string 62 fails or potentially is failing. For example, each string 62 may include an electrical device 66 at any suitable location along the string 62 where if a potential cell problem within the string 62 is detected, the device 66 can be electrically opened to remove that string 62 from the battery pack circuit. Thus, the voltage provided by all of the cells 64 in that string 62 will be removed. In this embodiment, the device 66 would likely be a single switch, and can be any of the types of switches mentioned above, i.e., solid-state switch, relay or mechanical disconnect.

As mentioned above, each string 62 may have a varying degrees performance in its ability to provide a particular state of charge. Those strings 62 that have a lower performance typically draw power from the strings 62 that have a higher performance causing the lower performing cells or modules to dictate the performance of the battery pack 60. This also applies in the charging mode where weaker cells will draw disproportionate charging energy and not permit stronger cells to fully charge. Thus, it may be desirable to include a control module as the device 66, where the module is able to provide cell voltage and state of charge balancing between the strings 62 that are electrically coupled in parallel. The module could be designed to also provide an open circuit so that it also operates as a switch to remove the string 62 from the battery circuit, as described above.

Figure 5:
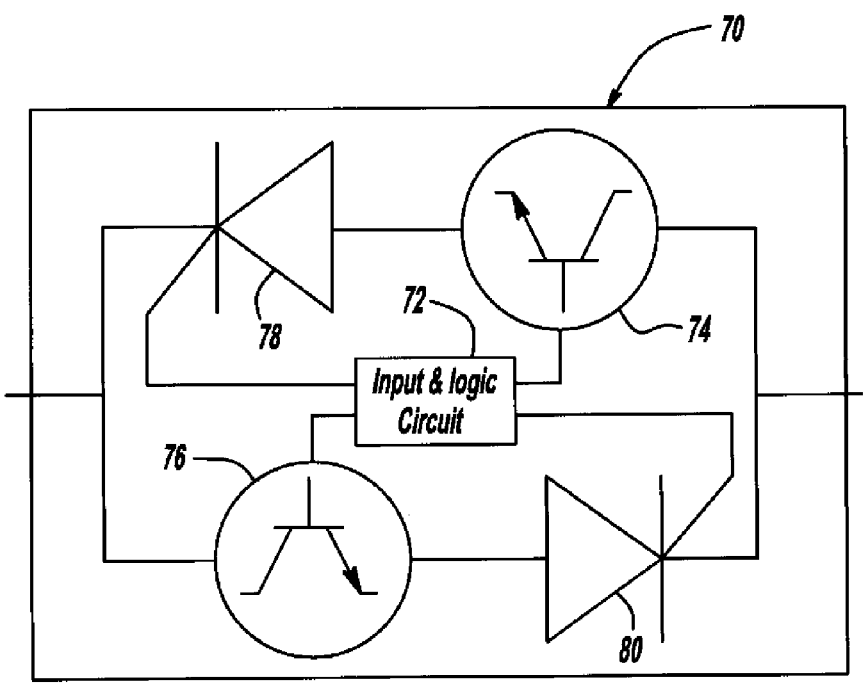
FIG. 5 is a schematic diagram of a parallel interface module.

FIG. 5 is a schematic diagram of a battery pack parallel interface (BPPI) module 70 that can provide state of charge control in each of the strings 62 to control the current flow in each string 62. The module 70 includes an inputs and logic circuit 72 that controls the operation of the module 70. The module 70 also includes two current paths controlled by electronic current regulating devices 74 and 76, such as IGBTs, where the direction of current flow during on-off switching modes through each path is controlled by the silicon controlled rectifiers (SCR) 78 and 80, respectively. The circuit 72 receives the current signal at the output of the SCRs 78 and 80. By opening both of the devices 74 and 76, the particular string 62 will be electrically removed from the battery pack 60. The module 70 provides the ability to control current between maximum pack rated and zero current for each individual string 62 thus allowing strings of various capacities and resistances to be connected in parallel and operated together.

The module 70 coupled to the end of a particular string 62 limits system performance based on its capability without degrading the system performance of the other strings 62 that may have a higher capability. For example, as the resistance of a particular string 62 changes for whatever reason, such as deterioration over its life, the switching characteristics of the module 70 causes the string 62 to be switched into and out of the circuit at a certain duty cycle. By switching the devices 74 and 76 in a manner controlled by the circuit 72, the current flow through the particular string 62 is selectively controlled where it would be on some percentage of the time and off for some percentage of the time.

The battery controller (not shown) would determine the capability of each string 62 based on resistance, voltage, temperature, etc., as discussed above, and that capability would determine the particular strings operational limits. Using the state of charge information for all of the strings 62, the controller would determine which string 62 had the largest operational range and base the charging and discharging of the other strings 62 on that range. For example, if the controller determines that one of the strings 62 has 80% of the state of charge range as the string 62 with the largest state of charge range, then the devices 74 and 76 would be controlled, depending on whether the battery pack 60 was in a charge or discharge mode, to determine how long that string 62 would be switched into the battery circuit. For this example, if the battery pack 60 is in the discharge mode, the circuit 72 would open the device 74 and turn the device 76 on and off at a certain duty cycle that set the amount of time that the string 62 was being discharged to be 80% of the total discharge time. Likewise, if the battery pack 60 is in the charge mode, then the device 76 is open and the device 74 is turned on and off at a duty cycle that corresponds to it being closed 80% of the charging time. In this manner, the performance of the battery pack 60 is based on the string 62 having the highest level of performance and not the lowest performing string 62.

Figure 6:
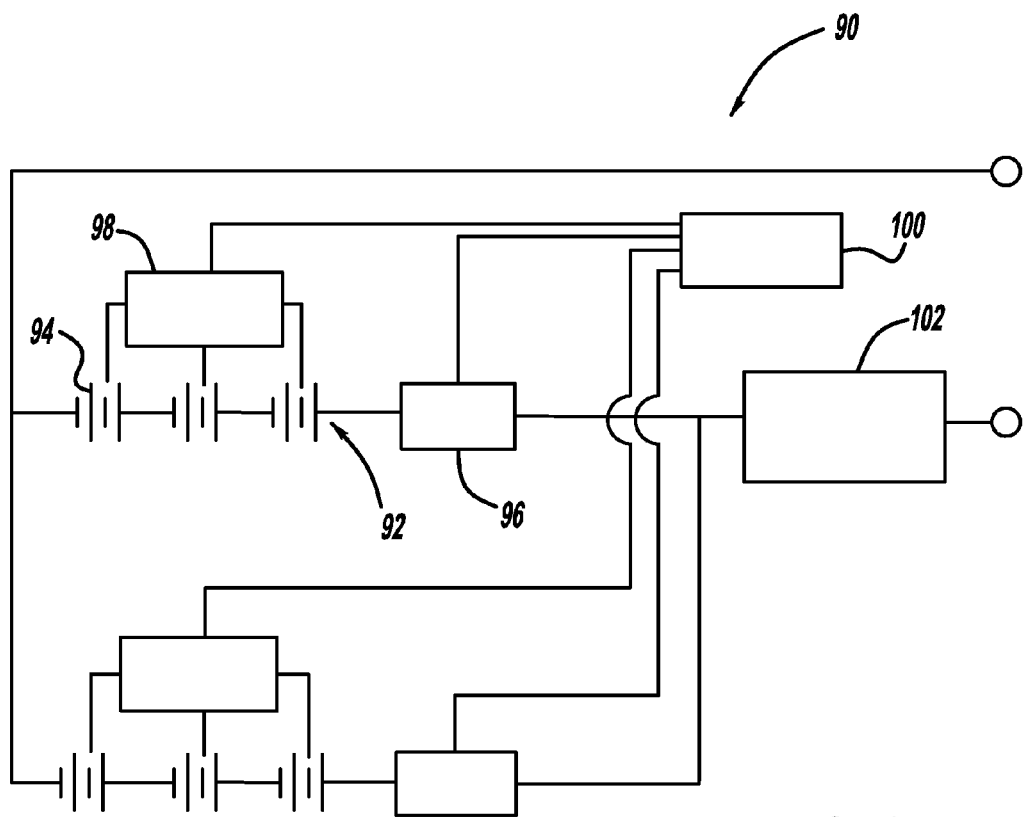
FIG. 6 is a schematic block diagram of a battery circuit including strings of series connected battery cells with parallel interface modules and cell balancing circuits.

FIG. 6 is a schematic block diagram of a battery circuit 90 including strings 92 of series connected battery cells defined herein as groups of battery cells 94. Each string includes a BPPI module 96 that operates in the manner as discussed above. In certain battery pack designs, cell balancing is required to maintain the voltage of the groups of battery cells 94 to be the same. Thus, the circuit 90 includes cell balancing circuits 98 for this purpose that operates in a manner well known to those skilled in the art. The switching characteristics for the devices 74 and 76 and the control of the cell balancing circuits 98 are determined by a cell balancing controller 100 that provides the signals for cell balancing and cell monitoring. A bi-directional inverter and charge controller 102 sets the amount of charging current for each string 92.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A battery by-pass circuit comprising:
a battery including a plurality of battery cells electrically coupled in series;
one or more temperature sensors for providing temperature data for the plurality of battery cells;
a first switch electrically coupled in series with at least one battery cell;
a by-pass line electrically coupled around the at least one battery cell;
a second switch electrically coupled within the by-pass line and electrically coupled in parallel with the at least one battery cell; and
a controller being configured to control the position of the first and second switches, said controller closing the first switch and opening the second switch during normal operation of the at least one battery cell and opening the first switch and closing the second switch during a performance loss of the at least one battery cell, where the performance loss is identified by the temperature data exceeding a predetermined maximum temperature threshold, and where the at least one battery cell is a set of more than one battery cell where opening the first switch disconnects the set of battery cells from the plurality of battery cells and closing the second switch by-passes the set of battery cells,
where the plurality of battery cells are part of a battery module that is electrically coupled in parallel with other battery modules in the battery where all of the battery modules include a plurality of battery cells electrically coupled in series, and where each of the battery modules includes a battery pack parallel interface (BPPI) module electrically coupled in series with the plurality of battery cells and a cell balancing circuit electrically coupled in parallel with the plurality of battery cells, and the controller provides signals to the cell balancing circuits for maintaining a consistent voltage across all of the battery modules, and the controller also provides signals to the BPPI modules to control charging and discharging current through each of the battery modules, and where each cell balancing circuit can bypass any of the battery cells in its battery module, and each BPPI module can shut off current flow to remove its battery module from the battery circuit.

2. The circuit according to claim 1 wherein the first and second switches are solid-state switches.

3. The circuit according to claim 1 wherein the first and second switches are relays.

4. The circuit according to claim 1 wherein the first and second switches are mechanical disconnects.

5. The circuit according to claim 1 wherein the battery cells are lithium-ion battery cells.

6. The circuit according to claim 1 wherein the battery is a vehicle battery.

7. The circuit according to claim 6 wherein the vehicle is a hybrid vehicle.

8. A battery circuit comprising at least one battery module including a plurality of battery cells electrically coupled in series, and wherein the battery module is electrically coupled in parallel with other battery modules in the battery circuit where each of the battery modules includes a plurality of battery cells electrically coupled in series, and where each of the battery modules includes a battery pack parallel interface (BPPI) module electrically coupled in series with the plurality of battery cells and a cell balancing circuit electrically coupled in parallel with the plurality of battery cells, the battery circuit further comprising a controller which provides signals to the cell balancing circuits for maintaining a consistent voltage across all of the battery modules, and the controller also provides signals to the BPPI modules to control charging and discharging current through each of the battery modules, and where each cell balancing circuit can bypass any of the battery cells in its battery module, and each BPPI module can shut off current flow to remove its battery module from the battery circuit.

9. The circuit according to claim 8 wherein the battery cells are lithium-ion battery cells.

10. The circuit according to claim 8 wherein the battery circuit is used in a hybrid vehicle.

11. A battery circuit for a hybrid vehicle, said circuit including a plurality of battery modules electrically coupled in parallel, each of the battery modules including a plurality of battery cells electrically coupled in series, where each of the battery modules includes a battery pack parallel interface (BPPI) module electrically coupled in series with the plurality of battery cells and a cell balancing circuit electrically coupled in parallel with the plurality of battery cells, where the BPPI module includes an inputs and logic circuit for controlling operation of the BPPI module, two current regulating devices for regulating current flow, and two silicon controlled rectifiers for controlling direction of current flow, the battery circuit further comprising a controller which provides signals to the cell balancing circuits for maintaining a consistent voltage across all of the battery modules, and the controller also provides signals to the BPPI modules to control charging and discharging current through each of the battery modules, and any of the battery modules can be removed from the battery circuit by shutting off current flow through its BPPI module.

12. The circuit according to claim 11 wherein the battery cells are lithium-ion battery cells.

13. The circuit according to claim 8 wherein the BPPI module includes an inputs and logic circuit for controlling operation of the BPPI module, two current regulating devices for regulating current flow, and two silicon controlled rectifiers for controlling direction of current flow.

14. The circuit according to claim 13 wherein the current regulating devices are insulated-gate bipolar transistors (IGBTs).

15. The circuit according to claim 8 wherein the controller signals each BPPI module to control the charging and discharging current for its battery module using a duty cycle which is based on a state of charge range for its battery module.

\* \* \* \* \*